(12) United States Patent
Tustison

(10) Patent No.: US 11,079,201 B2
(45) Date of Patent: Aug. 3, 2021

(54) FIREARM ACCESSORY HOLDER

(71) Applicant: Lonnie Dale Tustison, Nampa, ID (US)

(72) Inventor: Lonnie Dale Tustison, Nampa, ID (US)

( * ) Notice: Subject to any disclaimer, the term of this patent is extended or adjusted under 35 U.S.C. 154(b) by 0 days.

(21) Appl. No.: 16/204,833

(22) Filed: Nov. 29, 2018

(65) Prior Publication Data

US 2019/0162506 A1 May 30, 2019

Related U.S. Application Data

(60) Provisional application No. 62/592,285, filed on Nov. 29, 2017.

(51) Int. Cl.
*F41C 27/00* (2006.01)
*F16M 13/02* (2006.01)
*F41G 11/00* (2006.01)

(52) U.S. Cl.
CPC .............. *F41C 27/00* (2013.01); *F16M 13/02* (2013.01); *F41G 11/003* (2013.01)

(58) Field of Classification Search
CPC .......... F41A 35/00; F41G 3/225; F41C 27/00; F41B 5/1492; F41B 5/148; A47F 5/00; F26B 19/00
See application file for complete search history.

(56) References Cited

U.S. PATENT DOCUMENTS

| | | | | |
|---|---|---|---|---|
| 4,486,955 A * | 12/1984 | Fisher | ..................... | F41G 3/225 |
| | | | | 33/1 PT |
| 5,732,912 A * | 3/1998 | Nomura | ................ | F16C 11/103 |
| | | | | 248/187.1 |
| 5,742,859 A * | 4/1998 | Acker | .................... | F16M 11/10 |
| | | | | 396/419 |
| 6,390,424 B1 * | 5/2002 | Kidushim | .............. | A45D 20/12 |
| | | | | 248/122.1 |
| 7,611,110 B2 * | 11/2009 | Franchini | ................ | F16C 11/10 |
| | | | | 248/227.4 |
| 8,656,624 B2 * | 2/2014 | Holmberg | ............... | F16B 7/182 |
| | | | | 42/90 |
| 9,534,730 B2 * | 1/2017 | Black | ..................... | F16M 11/10 |
| 9,709,356 B1 * | 7/2017 | Anstett | ................... | F41C 23/16 |
| 2013/0288743 A1 * | 10/2013 | Hunt | ..................... | F41G 11/004 |
| | | | | 455/556.1 |

FOREIGN PATENT DOCUMENTS

EP         1589313 A2 * 10/2005    ............ F41A 21/325

* cited by examiner

*Primary Examiner* — John Cooper
(74) *Attorney, Agent, or Firm* — Hogaboam Law Offices, PLLC; Romney J. Hogaboam

(57) ABSTRACT

An apparatus for moveably mounting an accessory to a device. The device facilitates a user positioning both the angle and rotation of the accessory relative to the device.

7 Claims, 5 Drawing Sheets

FIREARM ACCESSORY HOLDER

CROSS-REFERENCE TO RELATED APPLICATIONS

This application claims priority to provisional application 62/592,285 filed on Nov. 29, 2017.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A "SEQUENCE LISTING," A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC

Not Applicable

STATEMENT REGARDING PRIOR DISCLOSURES BY AN INVENTOR OR JOINT INVENTOR

Not Applicable

BACKGROUND OF THE INVENTION

People who seek to precisely shoot rifles long distances frequently record information on the adjustments required to hit targets at various distances and under various wind conditions. This information is frequently recorded on a "dope" (Data On Previous Engagement) card. Shooters, particularly hunters and competitive shooters, often need to locate this information very quickly. In a match, a shooter may have to hit four or more targets of various size and at various distances in not more than 90 seconds. Long range hunters may similarly face short time windows to shoot at game before the game moves out of view or rotate to an orientation which makes an ethical shot impossible. Therefore, a dope card is frequently placed in a location which is readily accessible to the shooter. Common locations are on a shooter's wrist or forearm, on a card taped to the stock of a rifle, on a shooting mat, and in a folder. Shooters also need to position certain other accessories in readily accessible locations. These accessories include but are not limited to, wind meters and laser range finders.

Once a shooter is positioned to shoot a rifle, moving one's head away from the stock to look at a dope card or accessory, and then re-position on a rifle, can take valuable time causing time to expire in competition or cause a shooter to no longer have an ethical shot when hunting. Rifles which are shot precisely are frequently configured with magnified optics in the form of a telescopic sight known as a scope. Such rifles are also frequently configured with features which allow accessories to be attached, such as with one or more sections of MIL-STD-1913 (Picatinny) rail.

BRIEF SUMMARY OF THE INVENTION

The applicant's invention is a novel article of manufacture (apparatus) for attaching an accessory to a firearm. The apparatus is preferably defined by a shaft attached at both ends to rotatable friction pivots. In a preferred embodiment, the apparatus is configured to attach on one end to a Picatinny rail on the top or side of a firearm. In an alternative embodiment, the device is configured to attach on one end to a firearm scope. In a preferred embodiment, the device is configured to attach on a second end to flat surface configured to attach a dope card. In an alternative embodiment, the device is configured to attach on a second end to another shooting accessory.

DETAILED DESCRIPTION OF THE INVENTION

Figure 1:
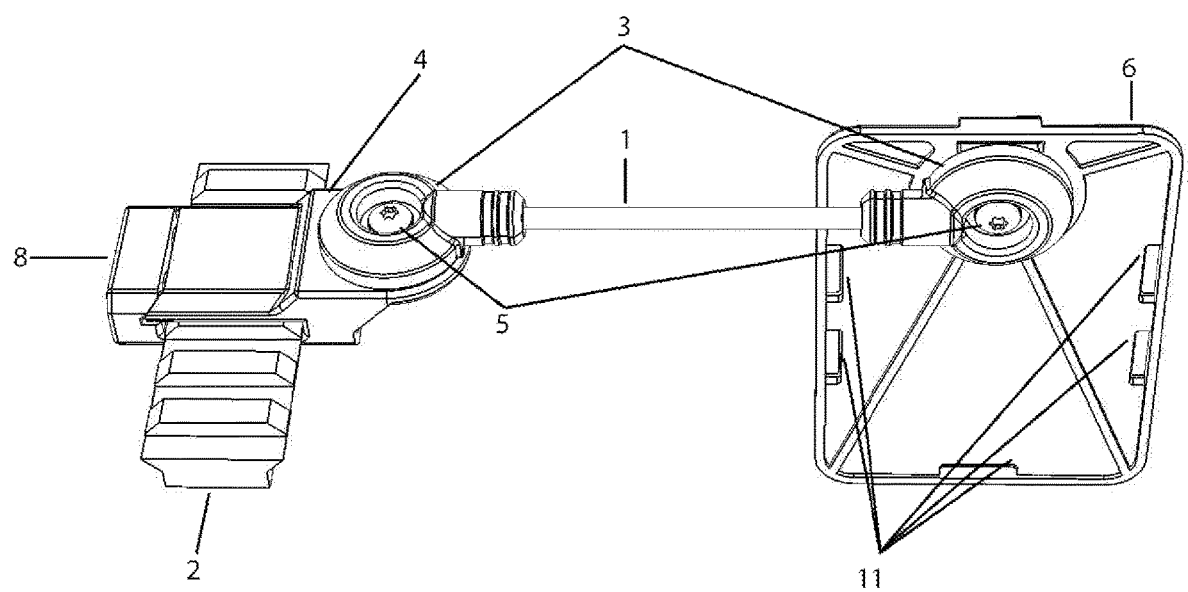
FIG. 1 shows a perspective view of the applicant's invention.
Figure 2:
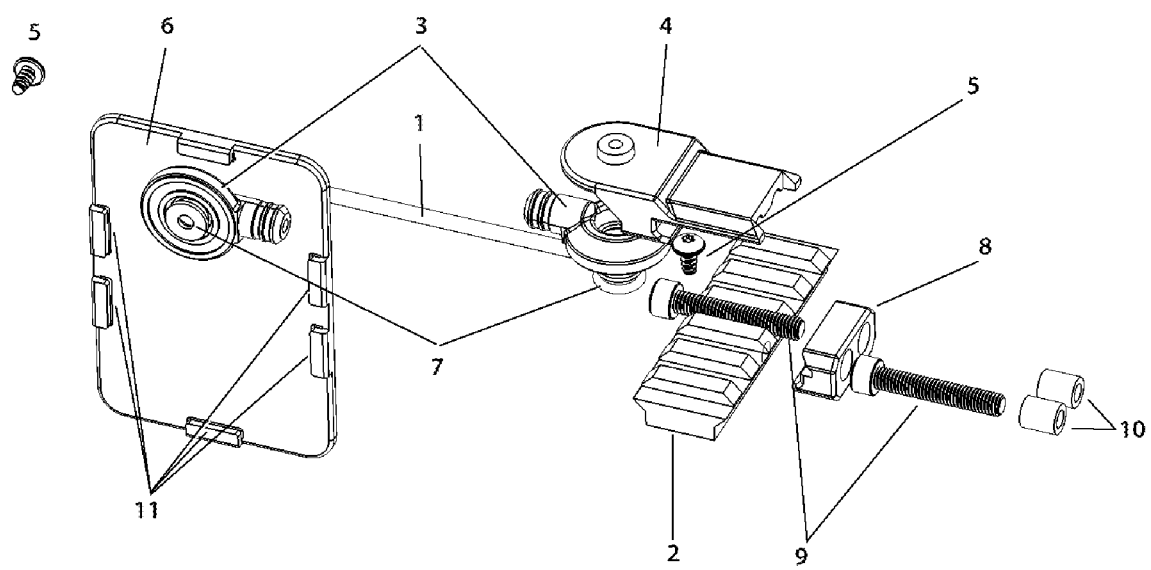
FIG. 2 shows an exploded view of the applicant's invention.
Figure 3:
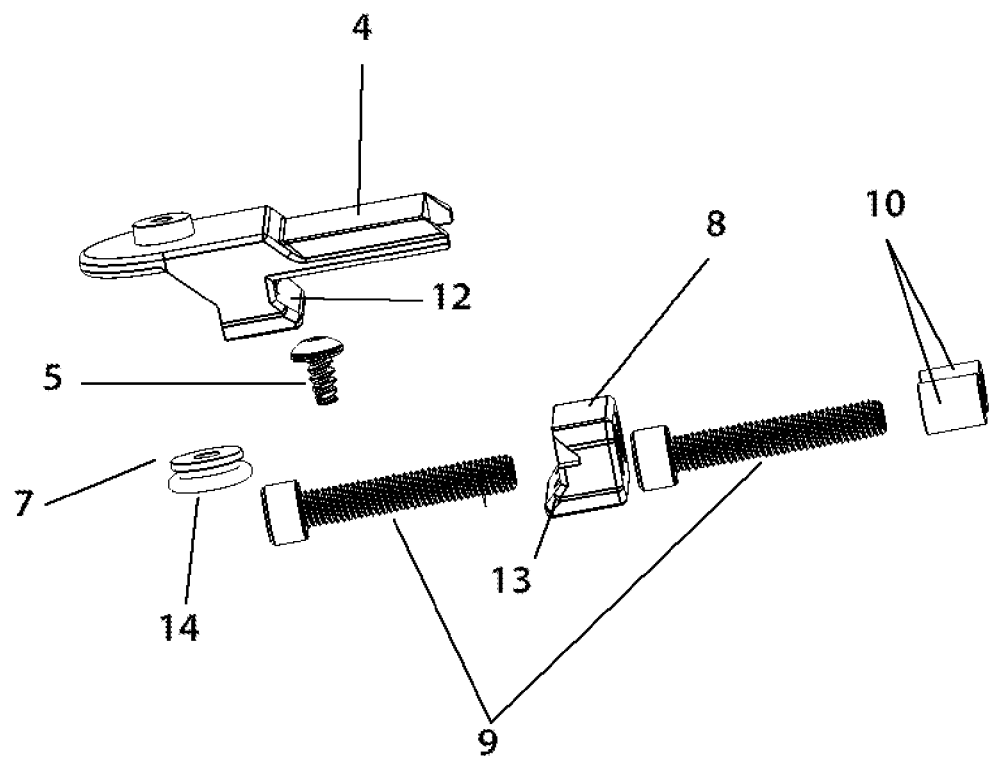
FIG. 3 shows an exploded view of the Picatinny mount of the applicant's invention.
Figure 4:
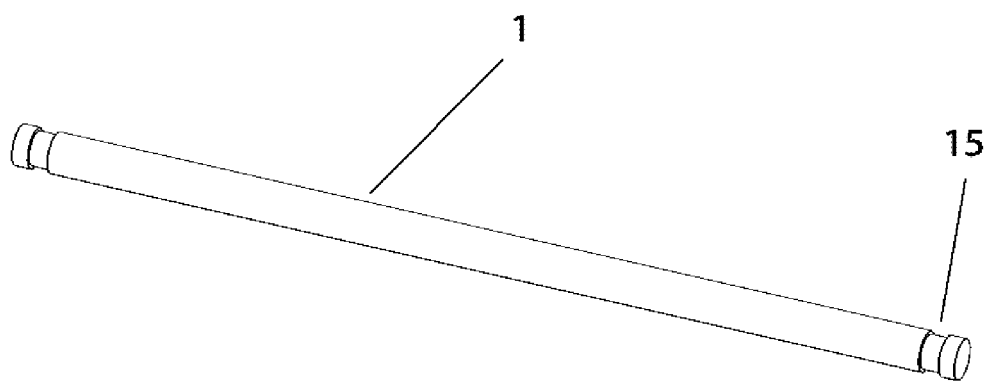
FIG. 4 shows a perspective view of the shaft of the applicant's invention.
Figure 5:
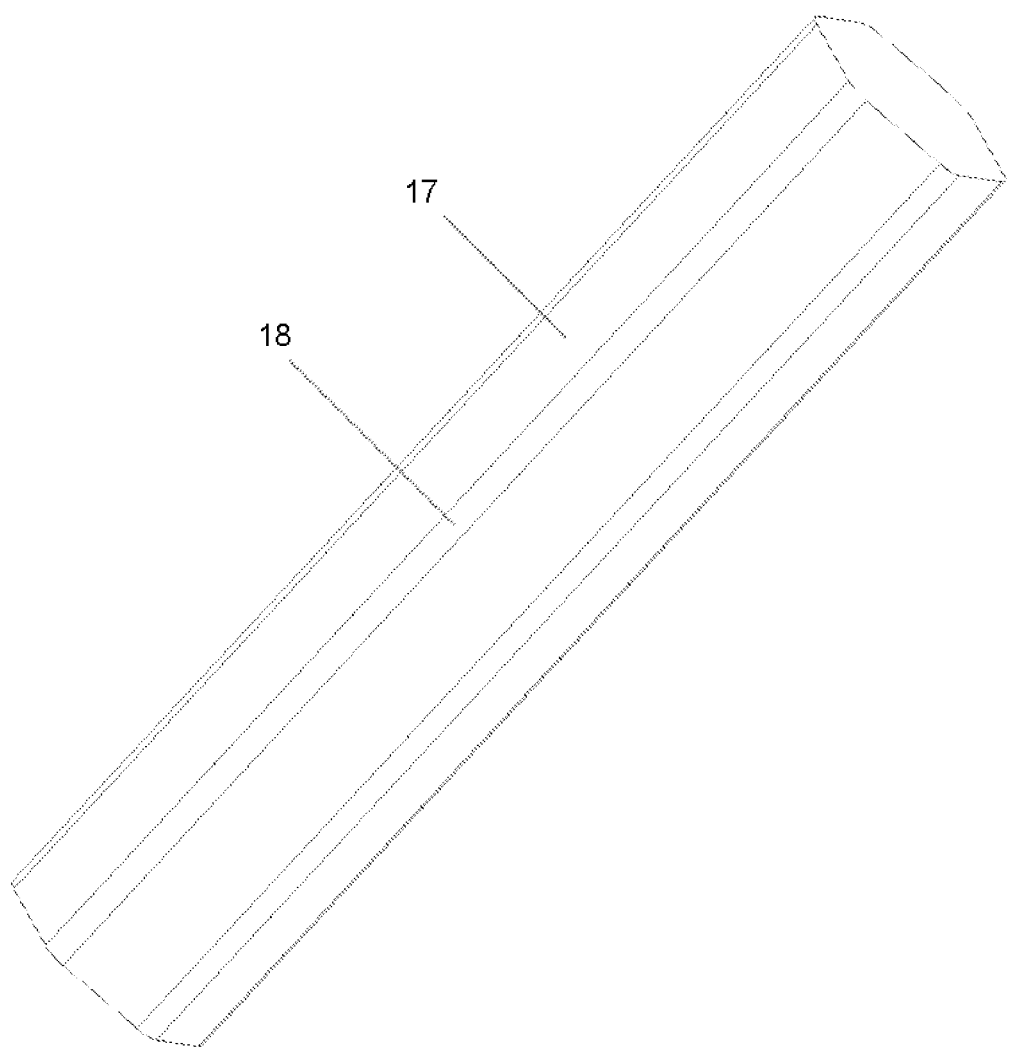
FIG. 5 shows a perspective view of a shaft of the applicant's invention.

The applicant's invention is a novel apparatus for attaching an accessory to a firearm. The article of manufacture is primarily defined by 1) a means for attaching (clamping between 4 and 8 achieved by screws 9) the article of manufacture to an apparatus 2, 2) a means for attaching (screw 5 passing through friction pivot shaft attachment member 3 into accessory 6) the article of manufacture to an accessory 6, and 3) a rigid means (such as shaft 1) for connecting said means for attaching the article of manufacture to an apparatus 2 to said means for attaching the article of manufacture to an accessory 6 attached at both ends to rotatable friction pivots. In a preferred embodiment, the article of manufacture is configured with a means for attaching the article of manufacture to an accessory 6 such as a dope card to a means for attaching the article of manufacture to an apparatus such as a section of picatinny rail 2 on the top or side of a firearm. In an alternative embodiment, the article of manufacture is configured to attach a dope card to a scope.

In a preferred embodiment, the rigid means for connecting said means for attaching the article of manufacture to an apparatus to said means for attaching the article of manufacture to an accessory 1 is cylindrical. In a preferred embodiment, the rigid means for connecting said means for attaching the article of manufacture to an apparatus to said means for attaching the article of manufacture to an accessory 1 is metal. In an alternative embodiment, at least a portion of the rigid means 17 for connecting said means for attaching the article of manufacture to an apparatus to said means for attaching the article of manufacture to an accessory is polygonal with preferably radiused corners 18. In this embodiment, the rigid means for connecting said means for attaching the article of manufacture to an apparatus to said means for attaching the article of manufacture to an accessory, or attachment, "ratchets" between indexed positions as it is rotated within the friction pivot.

An adjustable friction pivot is preferably comprised of multiple pieces. The friction pivot is comprised of a friction pivot shaft attachment member 3 configured to wrap around a shaft. The friction pivot shaft attachment member is configured with a flat surface. The flat surface of the friction pivot shaft attachment member 3 at one end of the shaft is configured to be parallel to a flat surface on a member 4 configured to attach, directly or indirectly, to a firearm. The flat surface of the friction pivot shaft attachment member 3 at the other end of the shaft is configured to be parallel to a flat surface on a member configured to attach to an accessory. The member configured to attach to a firearm 4 and the member configured to attach to an accessory 6 are collectively referred to as mating members. The friction pivot shaft attachment members 3 and mating members 4 and 6 are constructed of materials which provide a desirable coefficient of friction. In a preferred embodiment, each friction pivot shaft attachment member 3 is attached to its respective mating member by a screw 5 passing through the friction pivot shaft attachment member into threads in the mating member. The head of the screw 5 may be separated from the friction pivot shaft attachment member 3 by a washer 14. In certain embodiments, a deformable o-ring 14 selected of a material which provides a desirable coefficient of friction and degree of deformation is installed between the friction pivot shaft attachment member 3 and the mating member to achieve the desired coefficient of friction between the friction pivot shaft attachment member 3 and the mating member. In a preferred embodiment, the mating member is configured with the flat surface being further from the friction pivot shaft attachment than the top of the female threaded member. The distance between the top of the female threaded member and the flat surface of the mating member is selected such that the desired coefficient of friction is achieved when the screw 5 is tightened to the degree the end meets the bottom of the screw hole. In an alternative embodiment, the coefficient of friction between the friction pivot shaft attachment member and the mating member is also adjustable by tightening or loosening the screw 5 connecting the friction pivot shaft attachment member 3 to the mating member.

The friction pivot shaft attachment members 3 are configured to be rotatable around the shaft 1 on at least one end of the shaft. In a preferred embodiment, a portion of the shaft 1 is rebated 15 inside the connection with the friction pivot shaft attachment member 3 to prevent the friction pivot shaft attachment member 3 from sliding off the shaft 1. In a preferred embodiment, the friction pivot shaft attachment member is further configured with a protrusion having a diameter less than the diameter of the majority of the shaft configured to interface with a rebated portion 15 of the shaft thereby receiving a portion of the shaft having a diameter of the majority of the shaft. The friction pivot attachment member 3 is made from a material and sized such that the coefficient of friction between the friction pivot attachment member 3 and shaft 1 generally resists rotation but the shaft can be rotated with the application of sufficient force.

In a preferred embodiment, the mating member configured to be attached to the firearm contains features configured to attach to a MIL-STD-1913 (Picatinny) rail. In a preferred embodiment, the Picatinny rail attachment features comprise a main body 4 and a clamping member 8 joined by a plurality of screws 9. In a preferred embodiment, the main body contains protrusions configured to fit in grooves in a Picatinny rail 2, a dovetail 12 configured to interface with the edge of a Picatinny rail 2, and a plurality of holes configured to accept the passage of screws. In a preferred embodiment the clamping member 8 is configured with a dovetail 13 configured to interface with the edge of a Picatinny rail 2 and a plurality of female threaded members 10, preferably a thread insert, configured to cooperatively interface with each of the plurality of screws 9. In a preferred embodiment, the screws 9, which pass through the main body 4 and thread into the clamping member 8, pass through depressions in the Picatinny rail and draw the clamping member 8 toward the main body 4 clamping the Picatinny rail 2 when tightened. In an alternative embodiment, the mating member configured to be attached to the firearm contains features configured to attach to a telescopic rifle scope or other accessory attachment standard including, but not limited to, Arca Swiss, M-LOK, KeyMod, Dovetail rail, Weaver rail, Warsaw Pact rail, UTI rail, Rail Integration System (RIS), and NATO Accessory Rail.

In a preferred embodiment, the mating member configured to be attached to the accessory 6 contains a substantially flat surface to which written material, such as a piece of paper approximately the size of a business card, can be attached. In certain embodiments, the flat surface contains a plurality of ears 11 on at least one side configured to hold a piece of paper in place against the flat surface. In an alternative embodiment, the mating member configured to be attached to the accessory contains other features configured to attach an accessory to the mating member.

The applicant's invention is preferably configured such that, under the force of recoil, the friction members to not rotate but under the application of sufficiently greater force then the force of recoil, such as pressing the rod against a door or window, the friction mount yields to the applied force and rotates, thereby reducing the likelihood of injury or damage posed by or to the device.

SEQUENCE LISTING

Not Applicable

What is claimed is:

1. An article of manufacture for attaching an accessory to an apparatus comprising:
   a) a means for attaching the article of manufacture to an apparatus;
   b) a means for attaching the article of manufacture to an accessory; and
   c) a rigid means for connecting said means for attaching the article of manufacture to an apparatus to said means for attaching the article of manufacture to an accessory wherein:
   1) said rigid means for connecting said means for attaching the article of manufacture to an apparatus to said means for attaching the article of manufacture to an accessory is attached to both said means for attaching the article of manufacture to an apparatus and said means for attaching the article of manufacture to an accessory with a means for rotatably attaching said means for attaching the article of manufacture to an apparatus and said means for attaching the article of manufacture to an accessory relative to said rigid means for connecting said means for attaching the article of manufacture to an apparatus to said means for attaching the article of manufacture to an accessory wherein
   A) said rigid means for connecting said means for attaching the article of manufacture to an apparatus to said means for attaching the article of manufacture to an accessory is a substantially polygonal rod having at least one portion having a different radius than a-radius defined by a cross section of a majority of the substantially polygonal rod, and 2) said rigid means for connecting said means for attaching the article of manufacture to an apparatus to said means for attaching the article of manufacture to an accessory is attached to both said means for attaching the article of manufacture to an apparatus and said means for attaching the article of manufacture to an accessory with a means for pivotably attaching said means for attaching the article of manufacture to an apparatus and said means for attaching the article of manufacture to an accessory relative to said rigid means for connecting said means for attaching the article of manufacture to an apparatus to said means for attaching the article of manufacture to an accessory.

2. The article of manufacture of claim 1 wherein the vertexes of the substantially polygonal rod have a radius of curvature which is less than the radius defined by a cross section of a majority of the substantially polygonal rod.

3. An article of manufacture for attaching an accessory to an apparatus comprising:
  a) a means for attaching the article of manufacture to an apparatus;
  b) a means for attaching the article of manufacture to an accessory; and
  c) a rigid means for connecting said means for attaching the article of manufacture to an apparatus to said means for attaching the article of manufacture to an accessory wherein:
    1) said rigid means for connecting said means for attaching the article of manufacture to an apparatus to said means for attaching the article of manufacture to an accessory is attached to both said means for attaching the article of manufacture to an apparatus and said means for attaching the article of manufacture to an accessory with a means for rotatably attaching said means for attaching the article of manufacture to an apparatus and said means for attaching the article of manufacture to an accessory relative to said rigid means for connecting said means for attaching the article of manufacture to an apparatus to said means for attaching the article of manufacture to an accessory wherein
    A) said means for attaching the article of manufacture to an apparatus and said means for attaching the article of manufacture to an accessory are adjustable friction-fit connections,
    2) said rigid means for connecting said means for attaching the article of manufacture to an apparatus to said means for attaching the article of manufacture to an accessory is attached to both said means for attaching the article of manufacture to an apparatus and said means for attaching the article of manufacture to an accessory with a means for pivotably attaching said means for attaching the article of manufacture to an apparatus and said means for attaching the article of manufacture to an accessory relative to said rigid means for connecting said means for attaching the article of manufacture to an apparatus to said means for attaching the article of manufacture to an accessory, and
    3) said rigid means for connecting said means for attaching the article of manufacture to an apparatus to said means for attaching the article of manufacture to an accessory is a substantially cylindrical rod having at least one portion having a different diameter than a diameter defined by a cross section of the majority of the substantially cylindrical rod.

4. The article of manufacture of claim 3 wherein at the least one portion of said means for connecting said means for attaching the article of manufacture to an apparatus to said means for attaching the article of manufacture to an accessory having a different diameter than the diameter of the majority of the substantially cylindrical rod has a diameter less than the diameter defined by a cross section of the majority of the substantially cylindrical rod.

5. The article of manufacture of claim 4 wherein said means for attaching the article of manufacture to an apparatus and said means for attaching the article of manufacture to an accessory relative to said rigid means for connecting said means for attaching the article of manufacture to an apparatus to said means for attaching the article of manufacture to an accessory further comprise:
  a) a protrusion of said means for attaching the article of manufacture to an apparatus into at least one portion of said rigid means for connecting said means for attaching the article of manufacture to an apparatus to said means for attaching the article of manufacture to an accessory having a diameter less than a diameter defined by a cross section of a majority of the substantially cylindrical rod, and
  b) a protrusion of said means for attaching the article of manufacture to an accessory into at least one portion of said means for connecting said means for attaching the article of manufacture to an apparatus to said means for attaching the article of manufacture to an accessory having a diameter less than the diameter defined by a cross section of a majority of the substantially cylindrical rod.

6. The article of manufacture of claim 5 wherein said means for attaching the article of manufacture to an apparatus is configured to interface with, and connect to, an accessory connection standard.

7. The article of manufacture of claim 6 wherein said accessory connection standard is selected from the group consisting of: Picatinny (MIL-STD-1913), Arca Swiss, M-LOK, KeyMod, Dovetail rail, Weaver rail, Warsaw Pact rail, UTI rail, Rail Integration System (RIS), NATO Accessory Rail, and a cylindrical scope body.

* * * * *